(12) United States Patent
Montagne

(10) Patent No.: US 8,220,958 B2
(45) Date of Patent: Jul. 17, 2012

(54) LIGHT-BEAM SHAPER

(75) Inventor: Louis Montagne, Cailloux sur Fontaines (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 12/593,382

(22) PCT Filed: Apr. 4, 2008

(86) PCT No.: PCT/IB2008/051264
§ 371 (c)(1),
(2), (4) Date: Sep. 28, 2009

(87) PCT Pub. No.: WO2008/122941
PCT Pub. Date: Oct. 16, 2008

(65) Prior Publication Data
US 2010/0118531 A1    May 13, 2010

(30) Foreign Application Priority Data
Apr. 5, 2007   (EP) ..................... 07300925

(51) Int. Cl.
*F21V 1/00*   (2006.01)
(52) U.S. Cl. ............. 362/235; 362/244; 362/335
(58) Field of Classification Search ........... 362/235, 362/431, 244, 335, 296.06, 296.08
See application file for complete search history.

(56) References Cited

U.S. PATENT DOCUMENTS

| | | | |
|---|---|---|---|
| 2,908,197 A | 10/1959 | Well et al. | |
| 3,596,136 A | 7/1971 | Fischer | |
| 3,711,722 A | 1/1973 | Kavanagh | |
| 3,774,021 A | 11/1973 | Johnson | |
| 4,161,770 A | 7/1979 | Maurer | |
| 4,609,978 A * | 9/1986 | Hsieh et al. | 362/335 |
| 4,698,730 A | 10/1987 | Sakai et al. | |
| 4,733,338 A | 3/1988 | Feher et al. | |
| 4,860,177 A | 8/1989 | Simms | |
| 4,941,072 A | 7/1990 | Yasumoto et al. | |
| 5,013,144 A | 5/1991 | Silverglate et al. | |
| 5,130,897 A | 7/1992 | Kuzma | |
| 5,140,220 A | 8/1992 | Hasegawa | |
| 5,335,157 A | 8/1994 | Lyons | |
| 5,481,440 A | 1/1996 | Oldham et al. | |

(Continued)

FOREIGN PATENT DOCUMENTS

EP    1431653 A2    6/2004

(Continued)

OTHER PUBLICATIONS

Bortz et al., "Optimal design of a nonimaging projection lens for use with an LED source and a rectangular target", 2000, pp. 130-138, vol. 4092, California.

*Primary Examiner* — Evan Dzierzynski
(74) *Attorney, Agent, or Firm* — John F. Salazar; Mark L. Beloborodov

(57) ABSTRACT

The invention relates to an optical device for imparting an elongate shape to a light beam emitted by a LED, and to street luminaries which comprise such optical devices. The optical device comprises a lens (2) having an entry diopter (3) and an exit diopter (4) which comprises a first convergent section, a second convergent section and a divergent section bridging said first and second convergent sections.

14 Claims, 4 Drawing Sheets

U.S. PATENT DOCUMENTS

| | | | |
|---|---|---|---|
| 5,485,317 A | 1/1996 | Perissinotto et al. |
| 5,608,290 A | 3/1997 | Hutchisson et al. |
| 5,636,057 A | 6/1997 | Dick et al. |
| 5,924,788 A | 7/1999 | Parkyn, Jr. |
| 6,045,240 A | 4/2000 | Hochstein |
| 6,050,707 A | 4/2000 | Kondo et al. |
| 6,177,761 B1 | 1/2001 | Pelka et al. |
| 6,227,685 B1 | 5/2001 | McDermott |
| 6,273,596 B1 | 8/2001 | Parkyn, Jr. |
| 6,296,376 B1 | 10/2001 | Kondo et al. |
| 6,361,191 B1 | 3/2002 | Simon |
| 6,450,661 B1 | 9/2002 | Okumura |
| 6,560,038 B1 | 5/2003 | Parkyn, Jr. et al. |
| 6,598,998 B2 | 7/2003 | West et al. |
| 6,607,286 B2 | 8/2003 | West et al. |
| 6,623,150 B2 | 9/2003 | Roller et al. |
| 6,679,621 B2 | 1/2004 | West et al. |
| 6,784,357 B1 | 8/2004 | Wang |
| 6,837,605 B2 | 1/2005 | Reill |
| 6,850,001 B2 | 2/2005 | Takekuma |
| 6,942,361 B1 | 9/2005 | Kishimura et al. |
| 6,948,838 B2 | 9/2005 | Kunstler |
| 6,951,415 B2 | 10/2005 | Amano et al. |
| 6,965,715 B2 | 11/2005 | Lei et al. |
| 6,986,593 B2 | 1/2006 | Rhoads et al. |
| 6,997,580 B2 | 2/2006 | Wong |
| 7,006,306 B2 | 2/2006 | Falicoff et al. |
| 7,009,213 B2 | 3/2006 | Camras et al. |
| 7,021,801 B2 | 4/2006 | Mohacsi |
| 7,034,343 B1 | 4/2006 | Kim et al. |
| 7,040,767 B2 | 5/2006 | Lee et al. |
| 7,083,313 B2 | 8/2006 | Smith |
| 7,090,389 B2 | 8/2006 | Parker et al. |
| 7,101,056 B2 | 9/2006 | Pare |
| 7,104,672 B2 | 9/2006 | Zhang |
| 7,111,964 B2 | 9/2006 | Suehiro et al. |
| 7,118,262 B2 | 10/2006 | Negley |
| 7,142,769 B2 | 11/2006 | Hsieh et al. |
| 7,144,121 B2 | 12/2006 | Minano et al. |
| 7,153,000 B2 * | 12/2006 | Park et al. | 362/268 |
| 7,153,002 B2 | 12/2006 | Kim et al. |
| 7,172,319 B2 | 2/2007 | Holder et al. |
| 7,172,324 B2 | 2/2007 | Wu et al. |
| 7,181,378 B2 | 2/2007 | Benitez et al. |
| 7,276,737 B2 | 10/2007 | Camras et al. |
| 7,281,816 B2 | 10/2007 | Suzuki |
| 7,281,833 B2 | 10/2007 | Akiyama |
| 7,322,718 B2 | 1/2008 | Setomoto et al. |
| 7,334,918 B2 | 2/2008 | Newton et al. |
| 7,339,200 B2 | 3/2008 | Amano et al. |
| 7,339,202 B2 | 3/2008 | Chiu et al. |
| 7,348,723 B2 | 3/2008 | Yamaguchi et al. |
| 7,387,405 B2 | 6/2008 | Ducharme et al. |
| 7,390,109 B2 | 6/2008 | Li et al. |
| 7,431,492 B2 | 10/2008 | Ohkawa |
| 7,454,119 B2 | 11/2008 | Hsieh et al. |
| 7,458,703 B2 | 12/2008 | Han et al. |
| 7,473,014 B2 | 1/2009 | Katoh et al. |
| 7,549,769 B2 | 6/2009 | Kim et al. |
| 7,572,036 B2 | 8/2009 | Yoon et al. |
| 7,582,913 B2 | 9/2009 | Huang et al. |
| 7,602,559 B2 | 10/2009 | Jang et al. |
| 7,618,160 B2 | 11/2009 | Chinniah et al. |
| 7,618,163 B2 | 11/2009 | Wilcox |
| 7,674,018 B2 | 3/2010 | Holder et al. |
| 7,688,526 B2 | 3/2010 | Lu et al. |
| 2002/0163805 A1 * | 11/2002 | Hubbell et al. | 362/247 |
| 2003/0099115 A1 | 5/2003 | Reill |
| 2004/0037076 A1 | 2/2004 | Katoh et al. |
| 2004/0105264 A1 | 6/2004 | Spero |
| 2004/0228127 A1 | 11/2004 | Squicciarini |
| 2005/0265029 A1 | 12/2005 | Epstein et al. |
| 2006/0138437 A1 | 6/2006 | Huang et al. |
| 2006/0181866 A1 | 8/2006 | Jung et al. |
| 2006/0250803 A1 | 11/2006 | Chen |
| 2006/0255353 A1 | 11/2006 | Taskar et al. |
| 2006/0285311 A1 | 12/2006 | Chang et al. |
| 2007/0066310 A1 | 3/2007 | Haar et al. |
| 2007/0081340 A1 | 4/2007 | Chung et al. |
| 2007/0091615 A1 | 4/2007 | Hsieh et al. |
| 2007/0183736 A1 | 8/2007 | Pozdnyakov et al. |
| 2007/0253080 A1 | 11/2007 | Yokote et al. |
| 2008/0013322 A1 | 1/2008 | Ohkawa |
| 2008/0100773 A1 | 5/2008 | Hwang et al. |
| 2008/0204888 A1 | 8/2008 | Kan et al. |
| 2008/0273327 A1 | 11/2008 | Wilcox et al. |
| 2010/0073937 A1 * | 3/2010 | Ho | 362/335 |

FOREIGN PATENT DOCUMENTS

| | | |
|---|---|---|
| EP | 1621918 A1 | 2/2006 |
| JP | 11154766 A | 6/1999 |
| JP | 2004047647 A | 2/2004 |
| WO | 9624802 A1 | 8/1995 |
| WO | 9833007 A1 | 7/1998 |
| WO | 0216826 A1 | 2/2002 |
| WO | 0233449 A2 | 4/2002 |
| WO | 03044870 A1 | 5/2003 |
| WO | 2005093316 A1 | 10/2005 |
| WO | 2007100837 A2 | 9/2007 |

* cited by examiner

LIGHT-BEAM SHAPER

FIELD OF THE INVENTION

The invention relates to an optical device for imparting a desired shape to a light beam, this device being also designated as a "light-beam shaper". This optical device is particularly relevant for lighting surfaces which have a great length with respect to their width, such as a road, a street or a motorway.

BACKGROUND OF THE INVENTION

FIG. 1 depicts a schematic perspective view of a road section 1 equipped with three street luminaries 11a, 11b, 11c. The street luminaries, or candelabra, comprise a luminary post 111 and luminary head 112. Each street luminary enlightens a respective street zone 12a, 12b, 12c of the road section 1, each street zone having a length L. These enlightened street zones may be slightly overlapping in overlapping zones 13a, 13ab, 13bc, 13c. Usually as illustrated on FIG. 1, street luminaries are set back from the border 14 of the road section 1. For instance, they are erected on a pavement, on the border 14 of the road section 1. Indeed, due to the traffic, it is not possible to install the street luminaries right over the zones that need to be enlightened, as this would be too dangerous.

It is known to provide reflectors arranged in the luminary head, across the light path, in order to direct the light beam with an appropriate angle, towards the street.

Moreover, it is preferred to increase the distance between two consecutive street luminaries 11a and 11b, or 11b and 11c, in order to reduce the costs of installation and maintenance. Various reflector systems have been proposed to provide an elongate beam. Such reflector systems are quite bulky.

For street lighting, usual light sources are high intensity discharge lamps like sodium vapor lamps, fluorescent balloons or fluorescent tubes. However, these kinds of sources are quite bulky and they require a frequent and time-consuming maintenance. A consequence of bulkiness is that the luminary heads also are bulky, which may be a drawback under windy conditions.

SUMMARY OF THE INVENTION

It is an object of embodiments of the invention to provide a street luminary that allows for lighting homogeneously a street zone lengthwise, without risk of dazzling to the street user.

It is another object of embodiments of the invention to provide a street luminary that satisfies street lighting regulations, in particular as regards lighting uniformity, lighting intensity, glare and sky pollution.

It is another object of embodiments of the invention to provide a street luminary with reduced wind sensitivity.

It is a further object of embodiments of the invention to provide a street luminary that seldom requires maintenance. It is also an object of embodiments of the invention to provide a street luminary that has low operating costs.

To this end, an embodiment of the invention proposes an optical device for imparting an elongate shape to a light beam, also called a light-beam shaper, said optical device comprising a lens having (i) an entry diopter and (ii) an exit diopter which comprises a first convergent section, a second convergent section and a divergent section bridging said first and second convergent sections.

Such an optical device may be used to shape the light beam emitted by a light source. Usually, such light beams are substantially round: they have a revolution geometry with maximum light intensity about the axis of the light beam. The optical device according to the invention redistributes the light flux. This redistribution results in an elongate light beam which has preferably a symmetrical light distribution lengthwise.

Another embodiment of the invention proposes a luminary head, useful in particular for street lighting, comprising a plurality of light emitting diodes (LED), each LED being arranged upstream of a light-beam shaper, said light-beam shapers having substantially the same bearing.

Such a luminary head may be quite thin thanks to the use of LEDs as miniature light sources. As the light-beam shapers all have substantially the same bearing, i.e. they are oriented towards the same direction, it is not necessary to provide reflectors to direct the light beams with the right angle relative to the road. This simplifies the manufacture of the luminary heads.

These and other aspects of the invention will be apparent from and elucidated with reference to the embodiments described hereinafter.

BRIEF DESCRIPTION OF THE DRAWINGS

The invention will now be described in more details by way of example with reference to the accompanying drawings, in which.

DETAILED DESCRIPTION OF THE INVENTION

Figure 1:
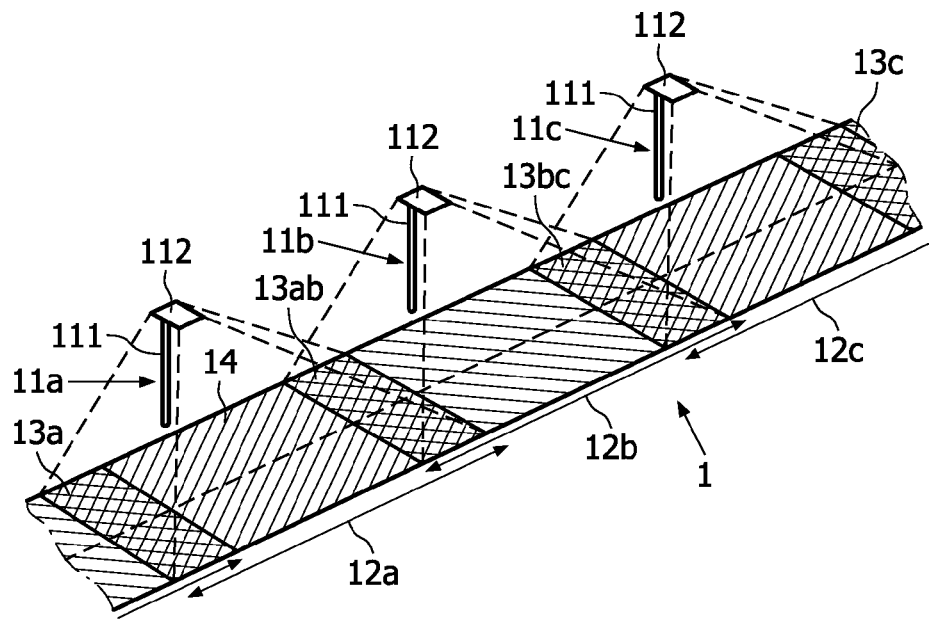
FIG. 1 shows a schematic perspective view of a road section equipped with street luminaries.
Figure 2A:
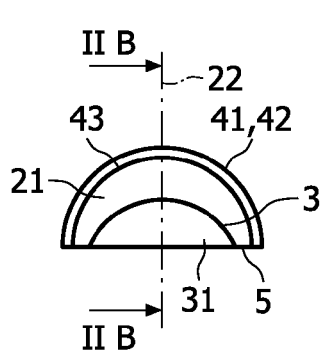
FIG. 2 shows different schematic views of a first embodiment of an optical device according to the invention, namely: a straight cross-section (FIG. 2A), a longitudinal cross-section (FIG. 2B), a perspective view from above (FIG. 2C) and a plane view from below (FIG. 2D)
Figure 2B:
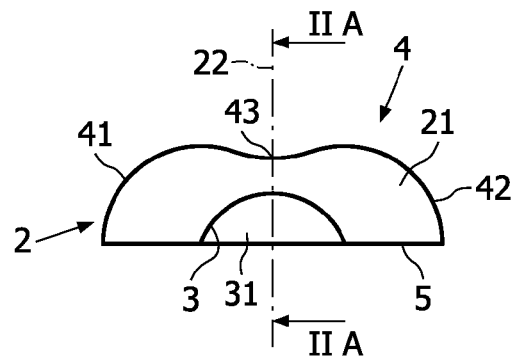
Figure 2C:
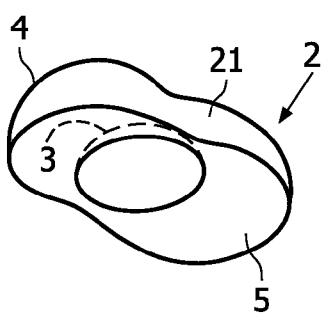
Figure 2D:
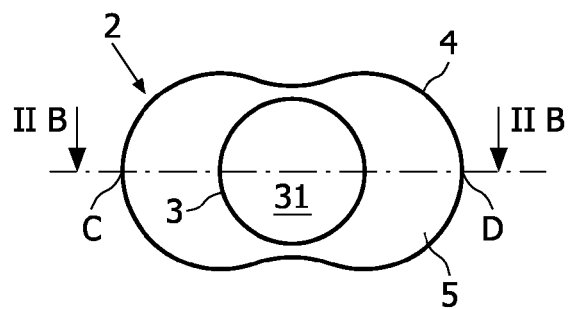

The following definitions are adopted in this specification. The words "street", "road", "motorway" and the like shall be construed as having a similar meaning.

A diopter is an optical surface which separates two light propagation media having different refractive indices. Examples of light propagation media are, for instance, air, glass, polymethacrylate or other plastics.

A lens is a device that causes light to either converge or diverge. It is made from a piece of shaped material, such as glass, polymethacrylate or other plastics. Usually, a lens has two faces or diopters. A face, or a part thereof, may be planar (it is not curved), convex (bulging outwards from the lens) or concave (depressed into the lens).

A quadric is second-order surface. For instance, a sphere has a quadric surface.

A metasurface is the surface of a metaball.

A metaball is defined as follows. Each component $C_i$ of a metaball may be defined by a three-dimensional mathematical function $f_i(x,y,z)$ where x, y, z are the coordinates of a point in space. A thresholding value T is chosen. For each point (x,y,z) the sum S(x,y,z) of the contribution of each component of the metaball is computed and is compared to the threshold value T:

$$S(x, y, z) = \sum_{i=1}^{n} f_i(x, y, z) \quad \text{(Eq. 1)}$$

This function defines a scalar field. If S(x,y,z) is lower than the threshold value T, then point (x,y,z) is inside the volume of the metaball; if S(x,y,z) is equal to the threshold value T, then point (x,y,z) is on the surface of the metaball, i.e. on the metasurface. Otherwise, point (x,y,z) is outside of the metaball. In other words, the following inequality represents the volume enclosed in the metaball defined by components $C_i$:

$$\sum_{i=1}^{n} f_i(x, y, z) \leq T \quad \text{(Eq. 2)}$$

A sphere may be represented by the following equation, where $(x_o, y_o, z_o)$ are the coordinates of the center of the sphere and r is the radius of the sphere:

$$\sqrt{(x-x_o)^2 + (y-y_o)^2 + (z-z_o)^2} - r = 0 \quad \text{(Eq. 3)}$$

Furthermore, a cylinder with a z axis may be represented by the following equation, where r is the radius of the cylinder:

$$\sqrt{(x-x_o)^2 + (y-y_o)^2} - r = 0 \quad \text{(Eq. 4)}$$

It is well known that S(x,y,z) may be approximated with a polynomial function, in order to accelerate computation of the metaball and the metasurface. Further developments relating to metaballs and metasurfaces may be found on the Internet.

As indicated above, embodiments of the inventions relate to an optical device for imparting an elongate shape to a light beam. Said optical device comprises a lens having an entry diopter and an exit diopter. The exit diopter comprises a first convergent section, a second convergent section and a divergent section bridging said first and second convergent sections. In a preferred embodiment of the invention, said divergent section bridges smoothly said first and second convergent sections of the exit diopter.

Preferably, the lens is designed so that it is capable of shaping a round light beam into an elongate light beam having a substantially homogeneous light intensity lengthwise. This allows for the use of light sources such as light emitting diodes (LEDs), which usually emit round light beams. Other light sources may be appropriate. However, an advantage of LEDs is that they are miniature light sources. Thus, it becomes possible to build thin luminary heads which incorporate a plurality of LEDs, each LED being equipped with an optical device according to the invention, in order to shape a round light beam into an elongate light beam. For instance, the LEDs and their associated optical devices are arranged in a plurality of lines and rows. By imparting an appropriate bearing to the light beams, it is possible to direct the elongate light beam towards a road and light it, instead of lighting straight down under the light head. Moreover, it is possible to lodge radiators behind the LEDs (i.e. opposite the optical device with respect to the LED), between to lines of LEDs, as will be described below, with minimal impact on the thinness of the luminary head. Moreover, due to the high cost of power, the high efficiency of LEDs is beneficial.

FIG. 2 shows different views of a first embodiment of an optical device according to the invention. In this first embodiment, the lens 2 has an entry diopter 3 which is concave. It may be arranged as a lodging 31 for a light source. The general shape of the entry diopter is not an essential feature of the lens 2. However it is preferred that the general shape of the entry diopter 3 be spherical, or at least quadric. Indeed, such a shape has a minimal impact on the light rays distribution. This means that, when going through such an entry diopter, especially a spherical diopter, the light rays distribution remains substantially unaffected.

As illustrated on FIG. 2, a base surface 5 is located at the basis of the lens 2, between the entry diopter 3 and the exit diopter 4. Strictly speaking, base surface 5 should also be considered as a further diopter as such. However, the light source should preferably be arranged with respect to the entry diopter 3, for instance in the lodging 31, so that no light goes through the base surface 5 from the light source. This does not mean that absolutely no light passes through base surface 5, but simply that substantially all the light that is emitted by the light source is directed towards the entry diopter 3. Preferably, base surface 5 is substantially inscribed in a base plane. This eases the manufacture of optical devices according to the invention, as well as the assembly of said optical devices in larger lighting devices. However, the base surface may form an angle with plane IIA (FIG. 2B). For instance, the base surface may comprise two symmetrical parts which form an angle plan IIA.

Preferably, as illustrated on FIG. 2, the optical device according to the invention has two perpendicular planes of symmetry IIA, IIB, which are also perpendicular to the base plane in which the base surface 5 is inscribed. Planes IIA and IIB intersect on the centerline 22 of the lens 2. Preferably, the light source is located on the centerline 22 of the lens 2. Preferably said lodging 31 has an axis of symmetry which passes through said light source.

Most important is the shape of the exit diopter 4 of the lens 2. Indeed, it is mainly the shape of the exit diopter that conditions the light rays distribution at the exit of the light-beam shaper, and thus, the intensity of the exit light beam. When using a round light beam, it is necessary to enlarge it in order to impart an elongate shape thereto. Therefore, the exit diopter 4 comprises a first convergent section 41, a second convergent section 42 and a divergent section 43 bridging said first and second convergent sections 41,42. This allows for dispersing the round light beam, which is initially concentrated towards the divergent section, towards the distal convergent sections 41,42. The closer the convergent sections 41,42 are, the more contracted the exit light beam will be. In other words, the divergent section 43 contributes to enlargement of the exit light beam, whereas the convergent sections 41,42 contribute to contracting the exit light beam. A proper balance therebetween allows for a satisfactory light homogeneity along the exit light beam.

A better homogeneity of the exit light beam may be achieved through symmetry of the lens 2. Therefore, it is preferred that the exit diopter 41 comprises a rotationally symmetrical surface.

For instance, as illustrated on FIG. 2, rotation axis 23 is perpendicular to the centerline 22 of the lens 2, and it is inscribed in plane of symmetry IIB. When rotating the curve comprised between points C and D, around axis 23, the whole exit diopter 4 may be obtained. The same respectively may be said as regards the entry diopter 3, when it has a quadric surface, such as a spherical surface.

In a preferred embodiment of the invention, said convergent sections 41,42 of the exit diopter 4 comprise quadric surfaces, such as a spherical surface. In the embodiment illustrated on FIG. 2, the convergent sections 41,42 are convex and comprise spherical surfaces. They contribute to a metasurface which also comprises a cylinder contribution in the bridging divergent section 43, so that the whole surface remains continuous, without break of slope. The divergent section 43 derives from a cylinder the axis of which passes by the center of the two spheres from which the convergent sections 41,42 derive. Depending on the desired application, the height of this cylinder may be equal to, or lower than, the distance of the two above-mentioned spheres. In order to obtain a divergent section 43, the radius of the cylinder should be lower than that of the spheres. In the convergent sections, the contribution of the spheres to the metasurface is most significant, whereas in the divergent section, it is the contribution of the cylinder which is most significant.

Usually, it is desired that the exit light beam be symmetrical lengthwise as regards light intensity. Therefore, the convergent sections 41,42 of the exit diopter 4 should be symmetrical with respect to one another, as illustrated for instance on FIG. 2B. Such a feature also simplifies the manufacture of a lighting device as there is no question as to the proper orientation (left or right) of the lens.

Figure 6:
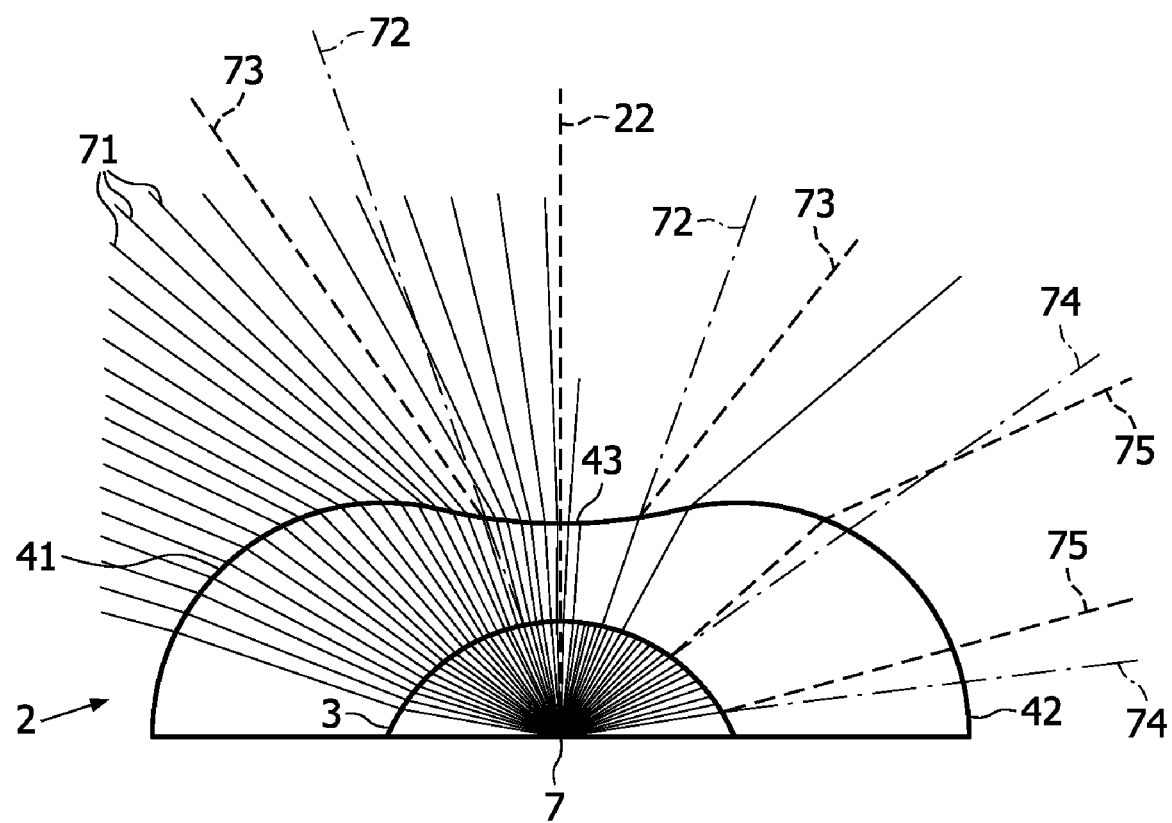
FIG. 6 depicts the 2D-path followed by light rays emitted by a punctual light source through an optical device as shown on FIG. 2.

FIG. 6 illustrates in 2D the path which is followed by light rays emitted by a punctual light source through an optical device as shown on FIG. 2. Such a light source normally leads to a round light beam. A LED 7 may be approximated as a punctual light source.

FIG. 6 shows the effect of the lens 2 on the round light beam emitted by the LED 7, and compares the resulting elongate light beam with the round light beam which would be obtained without the lens 2. Two groups of light rays are isolated: light rays that are at the center of the emitted light beam (i.e. close to the center line 22 of the lens 2) and light rays that are at the periphery of the light beam. For the purpose of illustration, if round light beam width is measured according to the full-width half-maximum method, which is well known in the art, then the light rays at "the center" of the light beam may be those which have a direction at an angle with the centerline 22 lower than half the width of the round light beam, whereas the light rays "at the periphery" of the light beam may be those the direction of which is at a greater angle with the centerline 22 than half the width of the round light beam.

The center of the light beam which would be obtained without an optical device 2, i.e. through straight propagation of the light rays 71, is delimited by the dash-and-dot lines 72. The dashed lines 73 show the light beam which is obtained after propagation of the same light rays through the lens 2. As can be seen, the center of the light beam is enlarged. This means that the center light beam will intercept a larger road surface. Thus, the road surface which is closest to the light source will receive less light energy per surface unit than what could be achieved without the lens 2.

Compare with the peripheral light beam: the dash-and-dot lines 74 show the light beam obtained after straight propagation; the dashed lines 75 show the light beam which is obtained after propagation of the same peripheral light rays through the lens 2. In the case of peripheral light rays, the light beam obtained after propagation through the lens 2 has a lower width than without the lens 2. Moreover, the peripheral light beam is closer to the centerline 22 of the lens 2. This means that the peripheral light beam will intercept a smaller road surface. The road surface which is enlightened by the peripheral light beam, i.e. that which is farthest from the light source, will receive more light energy per surface unit.

This redistribution of the light beam allows for a better lighting of a road section with an elongate light beam.

The exit light beam is as long as possible. The maximum distance between two consecutive street luminaries is limited by mandatory levels of lighting uniformity (to prevent dazzling of a road user between bright areas and dark areas) and intensity (to provide sufficient lighting) along the road. The width of the exit light beam is also limited by the glare at high angles and sky pollution.

However, it may be desired to provide an exit light beam that is more intense, or less elongate, on one side than on the opposite side. In that case, a convergent section of the exit diopter may be smaller than the opposite convergent section. Plane IIA will no longer be considered as a symmetry plane. The larger the convergent section, the more dispersed the light rays will be, which will result in a less intense light beam and a more elongate light beam. Another solution may be to locate the light source not on the centerline 22 of the lens, but, for instance, on a line parallel to the centerline 22 along the rotation axis 23. Of course, both solutions may be combined together.

Figure 5A:
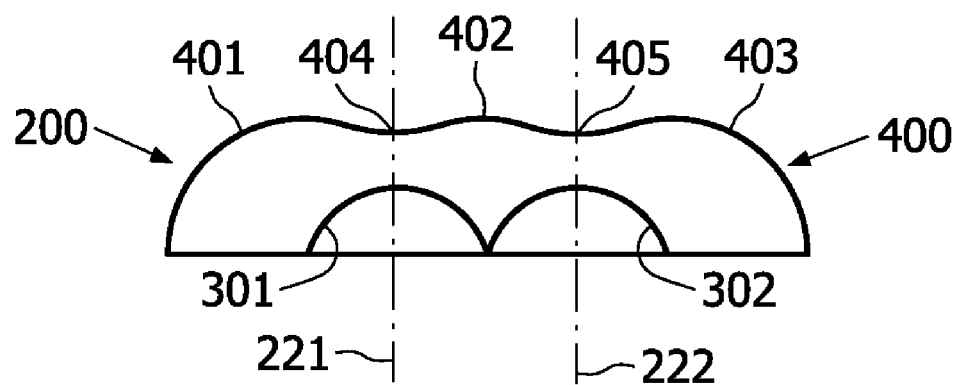
FIG. 5 show different schematic views of a second embodiment of an optical device according to the invention, namely: a longitudinal cross-section (FIG. 5A), and a plane view from below (FIG. 5B)
Figure 5B:
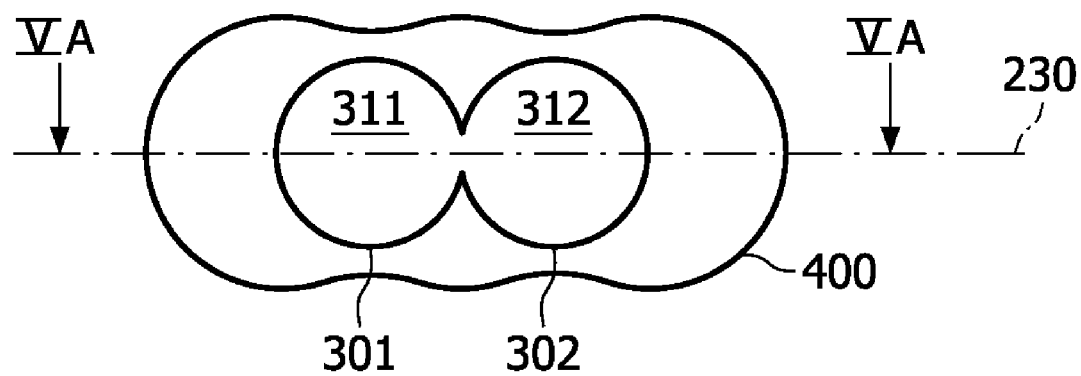

FIG. 5 represents another embodiment of an optical device according to the invention. In this embodiment, a lens 200 comprises two entry diopters 301,302 which are, in this instance, symmetrical with respect to each other. Each entry diopter may be arranged as a lodging 311,312 for a light source, such as a LED. As illustrated, the entry diopters have a spherical surface, but this is not compulsory, as explained above. The light sources are preferably located along the centerlines 221,222 of the entry diopters 301,302. The exit diopter 400 comprises three convergent sections 401,402,403 and two divergent sections 404,405. Divergent section 404 bridges convergent sections 401 and 402. Divergent section 405 bridges convergent sections 402 and 403. The exit diopter 400 is rotationally symmetrical around rotation axis 230. It comprises a metasurface which results from the combinations of spheres (convergent sections) and cylinders (divergent sections).

Such a lens 200 may be used, for instance, for color mixing. In this case, the light sources are chosen with different colors. With the embodiment of FIG. 5, the color of the exit light beam will change continuously lengthwise of the exit light beam, from substantially the color of the light source located in the lodging 311 to the color of the light source located in the lodging 312.

Lens 200 of FIG. 5 may also be used in order to simplify manufacture: only one lens is necessary in order to shape the light beam which is emitted by two light sources.

If it is desired to achieve color mixing homogeneously lengthwise of the exit light beam, then a more complex optical device may be designed, with three entry diopters: a central entry diopter will accommodate a light source having a first color, and two lateral entry diopters will each accommodate a light source having a second color.

In a further embodiment, instead of being aligned, the convergent sections of the exit diopters of the lens are laid out at the corners of a square, with divergent sections bridging consecutive corners, or opposite corners, or both consecutive and opposite corners. Such a lens will impart an elongate, cross, shape to a light beam.

Usually, lenses 2,200 are manufactured by compression moulding or injection moulding, according to well known techniques. Preferably, they are made with a transparent material. This material may be colored or colorless, depending on the desired application. For instance, an appropriate material is polymethacrylate, more specifically poly(methylmethacrylate). Other transparent plastics may be used such as polycarbonates.

Figure 3:
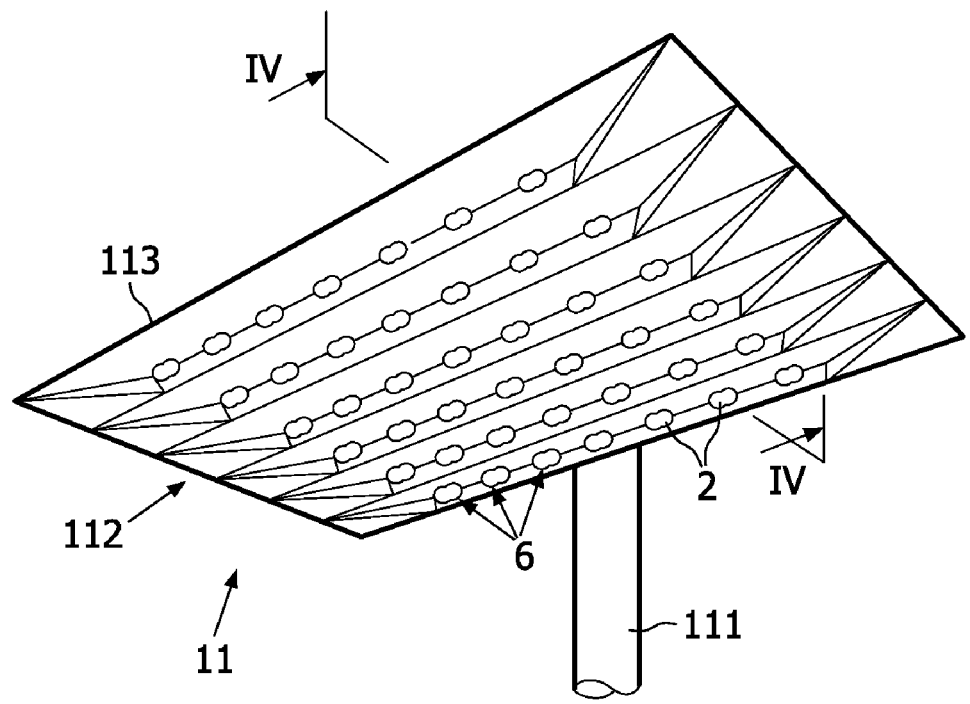
FIG. 3 shows a perspective view from below of a detail of a street luminary equipped with optical devices according to the invention.
Figure 4:
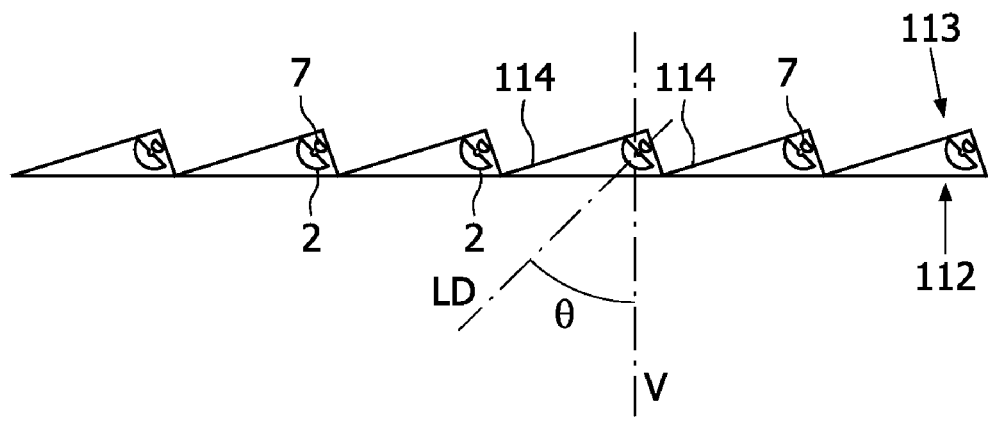
FIG. 4 shows a cross-section of the detail of FIG. 3, along plane IV-IV.

FIGS. 3 and 4 show various views of a street luminary 11 equipped with optical devices according to an embodiment of the invention. As can be seen on FIG. 3, a luminary head 112 seen from below is provided at the top of a luminary post 111 (partial view). The luminary head 112 comprises a support 113 for a plurality of lighting devices 6. Said lighting devices 6 are arranged below the support 113 of the luminary head 112, and they are directed towards the ground, namely towards a street. The lighting devices may be arranged, as illustrated on FIG. 3, in lines and rows.

Each lighting device 6 comprises a light emitting diode 7 (LED) upstream of an optical device 2 with respect to light propagation. Details of the optical device have been given above in the description. For instance, optical devices such as the embodiment of FIG. 2 are used. The LEDs 7 have a power supply which is not illustrated.

LEDs are a good alternative to standard light sources used for street lighting. A large number of LEDs may be mounted on each luminary head to provide sufficient lighting. In order to provide an attractive product, the dimensions of the luminary head should remain reasonably low.

One of the advantages of LEDs is miniaturization. In outdoor appliances, this allows for reduced thickness of the luminary head with miniaturized optics. The invention proposes optics for LEDs, easy to design and to adapt to a large range of configurations, and provides an elongate beam for street lighting with high efficiency which is comparable to classical rotational optics used for large area, with lower dimensions and which is able to provide lower sky pollution.

In order to properly enlighten a street zone, the lighting devices all have the same bearing, i.e. the light direction LD forms an angle theta with the vertical direction V. Thus, it is possible to define a recess 114 in the support 113 between two consecutive rows of lighting devices. This recess 114 is adapted to lodge a plurality of radiators (not illustrated) which are useful in order to drain and dissipate the heat which is produced while operating the LEDs. As the radiators are lodged in recesses 114, the luminary heads remain interestingly thin.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An optical device for imparting an elongated shape to a light beam, said optical device comprising:
    a lens having a centerline;
    an entry diopter defined by a quadratic surface and
    an exit diopter
    said exit diopter having a first convergent section, a second convergent section and a divergent section bridging said first and second convergent sections, said first and said second convergent sections defined by exit diopter quadratic surfaces;
    wherein said exit diopter has a rotationally symmetrical continuous surface constructed around a rotation axis perpendicular to said centerline.

2. The optical device of claim 1, wherein said exit diopter remains continuous without break of slope, said divergent section deriving from a cylinder having an axis of said cylindrical curve passing by the center of said first and said second convergent quadratic surfaces of said first and second convergent sections.

3. The optical device of claim 1, wherein said convergent sections of the exit diopter are symmetrical with respect to one another.

4. The optical device of claim 1, wherein said entry diopter comprises a lodging arrangement for a light source.

5. The optical device of claim 4, wherein said lodging has an axis of symmetry which passes through said light source.

6. The optical device of claim 4 wherein said lodging includes several light sources along said rotation axis.

7. The optical device of claim 4 wherein said surface of said lodging is a quadratic surface.

8. The optical device of claim 1 wherein said optical device includes a base plane and said diopter has two planes of symmetry perpendicular to said base plane and perpendicular to one another.

9. The optical device of claim 8 wherein said two planes of symmetry intersect said centerline.

10. The optical device of claim 8 wherein said rotation axis extends through one of said two planes of symmetry.

11. The optical device of claim 1 wherein said first convergent section is different from said second convergent section.

12. The optical device of claim 1 a second entry diopter symmetrical with said entry diopter of said lens.

13. The optical device of claim 1 further including a second entry diopter and wherein said exit diopter includes a second divergent section and a third convergent section, said second divergent section bridging said second convergent section and said third convergent section.

14. An optical device for imparting an elongate shape to a light beam, said optical device comprising:
    a lens having a centerline,
    an entry diopter defined by a quadratic surface and
    an exit diopter
    said exit diopter having a first convergent section, a second convergent section and a divergent section bridging said first and second convergent sections, said first and said second convergent sections defined by exit diopter quadratic surfaces;
    wherein said exit diopter has rotationally symmetrical continuous surface constructed around a rotation axis perpendicular to said centerline;
    wherein said exit diopter remains continuous without break of slope, said divergent section deriving from a cylinder having an axis, said axis of said cylindrical curve passing by the center of said first and said second convergent quadratic surfaces of said first and second convergent sections.

* * * * *